US005575969A

United States Patent [19]
Yamamori et al.

[11] Patent Number: 5,575,969
[45] Date of Patent: Nov. 19, 1996

[54] METHOD OF ATTACHING CLIP TO BLOW MOLDED ARTICLE AND THE CLIP

[75] Inventors: Takashi Yamamori; Yasuhiko Onishi, both of Yokkaichi, Japan

[73] Assignee: Sumitomo Wiring Systems, Ltd., Yokkaichi, Japan

[21] Appl. No.: 402,116

[22] Filed: Mar. 13, 1995

[30] Foreign Application Priority Data

May 17, 1994 [JP] Japan .................................. 6-103018

[51] Int. Cl.⁶ .................................................. B29C 49/20
[52] U.S. Cl. ............................................ 264/516; 264/515
[58] Field of Search ................................... 264/515, 516, 264/273; 425/112, 522, 503, 504

[56] References Cited

U.S. PATENT DOCUMENTS

| | | | |
|---|---|---|---|
| 4,280,859 | 7/1981 | Thompson | 264/515 |
| 4,342,799 | 8/1982 | Schwockert | 264/516 |
| 4,608,744 | 9/1986 | Nemoto | 264/516 |
| 5,332,866 | 7/1994 | Sawamura . | |

FOREIGN PATENT DOCUMENTS

| | | | |
|---|---|---|---|
| 59-20630 | 2/1984 | Japan | 264/516 |
| 60-18326 | 1/1985 | Japan | 264/516 |
| 3-34280 | 2/1991 | Japan . | |

OTHER PUBLICATIONS

EngOish abstract of Japanese Patent No. 3-34280.

Primary Examiner—Catherine Timm
Attorney, Agent, or Firm—Greenblum & Bernstein, P.L.C.

[57] ABSTRACT

A method of attaching a clip to a tubular blow molded article and the clip, the method comprising the steps of: preparing a clip including a clip body and a clip base which is provided at a base portion of the clip body and has a hollow and a number of through-holes communicating with the hollow; inserting the clip body of the clip into a cavity formed on a molding surface of the mold such that the clip base projects from the molding surface; setting softened synthetic resin to the mold; and bringing the synthetic resin into close contact with the molding surface of the mold at a blow pressure so as to deliver the synthetic resin to the hollow and the through-holes of the clip base such that the synthetic resin is filled into the hollow and the through-holes of the clip base, whereby the synthetic resin is molded to the blow molded article having the clip projecting from its outer peripheral surface.

3 Claims, 5 Drawing Sheets

METHOD OF ATTACHING CLIP TO BLOW MOLDED ARTICLE AND THE CLIP

BACKGROUND OF THE INVENTION

The present invention generally relates to a blow molded article acting as a protector for a wiring harness of a motor vehicle, etc. and more particularly, to a method of attaching to the blow molded article a clip for mounting the protector on a vehicle body or the like, and the clip.

In motor vehicles, air ducts or protectors for wiring harnesses are produced by blow molding in some cases. In blowing molding, softened synthetic resin is set into a mold and is brought into close contact with a molding surface of the mold at blow pressure so as to be molded as disclosed in Japanese Patent Laid-Open Publication No. 3-34280 (1991).

Meanwhile, a protector having a wiring harness passing therethrough is provided along a vehicle body and thus, is required to be mounted on a vehicle body panel. Conventionally, in order to mount a blow molded protector 1 on a vehicle body or the like as shown in FIG. 1, mounting portions 1a are protruded as burrs at the time of blow molding and then, a bolt hole 1b is bored at each of the mounting portions 1a. However, in this known method, burrs enabling boring of the bolt holes 1b at a desired location of each of the burrs are not necessarily formed at the time of blow molding. Furthermore, since the bolt holes 1b should be bored at the mounting portions 1a after blow molding, such problems arise that production of the protector 1 is time-consuming and strength of the mounting portions 1a is not sufficient.

Alternatively, as shown in FIG. 2, a clip hole 1c is bored on a peripheral wall of the protector 1 and then, a separate clip 2 is fitted into the clip hole 1c. However, in this prior art method, since operation of fitting the separate clip 2 into the clip hole 1c is required to be performed in addition to boring of the clip hole 1c, production of the protector 1 is time-consuming, thereby resulting in rise of its production cost.

SUMMARY OF THE INVENTION

Accordingly, an essential object of the present invention is to enable, with a view to eliminating the above mentioned drawbacks of the prior art, a clip to be easily attached to a blow molded article.

In order to accomplish this object of the present invention, a method of attaching a clip to a tubular blow molded article, according to the present invention comprises the steps of: preparing a clip including a clip body and a clip base which is provided at a base portion of the clip body and has a hollow and a number of through-holes communicating with the hollow; inserting the clip body of the clip into a cavity formed on a molding surface of the mold such that the clip base projects from the molding surface; setting softened synthetic resin into the mold; and bringing the synthetic resin into close contact with the molding surface of the mold at a blow pressure so as to deliver the synthetic resin to the hollow and the through-holes of the clip base such that the synthetic resin is filled into the hollow and the through-holes of the clip base, whereby the synthetic resin is molded to the blow molded article having the clip projecting from its outer peripheral surface.

The blow molded article can be properly used as an air duct or a protector for a wiring harness in a motor vehicle.

Meanwhile, the present invention also provides a clip attached to a blow molded article, comprising: a clip body; and a clip base which is provided at a base portion of the clip body; the clip base being formed, on its face remote from the clip body, with a hollow and being formed, on its side wall, with a number of through-holes communicating with the hollow.

The hollow of the clip base may be of latticed shape. Meanwhile, the clip base may be formed into a polygonal shape or a circular shape. It is desirable that the height of the clip base is approximately equal to the wall thickness of the blow molded article.

In the method of the present invention, the clip body of the clip is inserted into the cavity formed on the molding surface of the mold such that the clip base of the clip projects from the molding surface. Subsequently, the synthetic resin is set into the mold and is brought into close contact with the molding surface of the mold at the blow pressure so as to deliver the synthetic resin to the hollow and the through-holes of the clip base such that the synthetic resin is filled into the hollow and the through-holes of the clip base. As a result, since the clip is inserted into the blow molded article and the synthetic resin of the blow molded article is filled into the hollow and the through-holes of the clip base, the clip is rigidly fixed to the blow molded article.

Therefore, in the present invention, since a clip hole is not required to be bored on the blow molded article after blow molding and operation of fitting the clip into the clip hole also becomes unnecessary, production cost of the blow molded article can be lowered.

Meanwhile, if the clip base of the clip is formed with the hollow and a number of the through-holes communicating with the hollow are formed on the side wall of the clip base, the synthetic resin is readily delivered to the hollow and the through-holes of the clip base so as to be closely filled into the hollow and the through-holes, so that the clip can be fixed to the blow molded article more rigidly.

BRIEF DESCRIPTION OF THE DRAWINGS

This object and features of the present invention will become apparent from the following description taken in conjunction with the preferred embodiment thereof with reference to the accompanying drawings, in which.

Before the description of the present invention proceeds, it is to be noted that like parts are designated by like reference numerals throughout several views of the accompanying drawings.

DETAILED DESCRIPTION OF THE INVENTION

Figure 9:
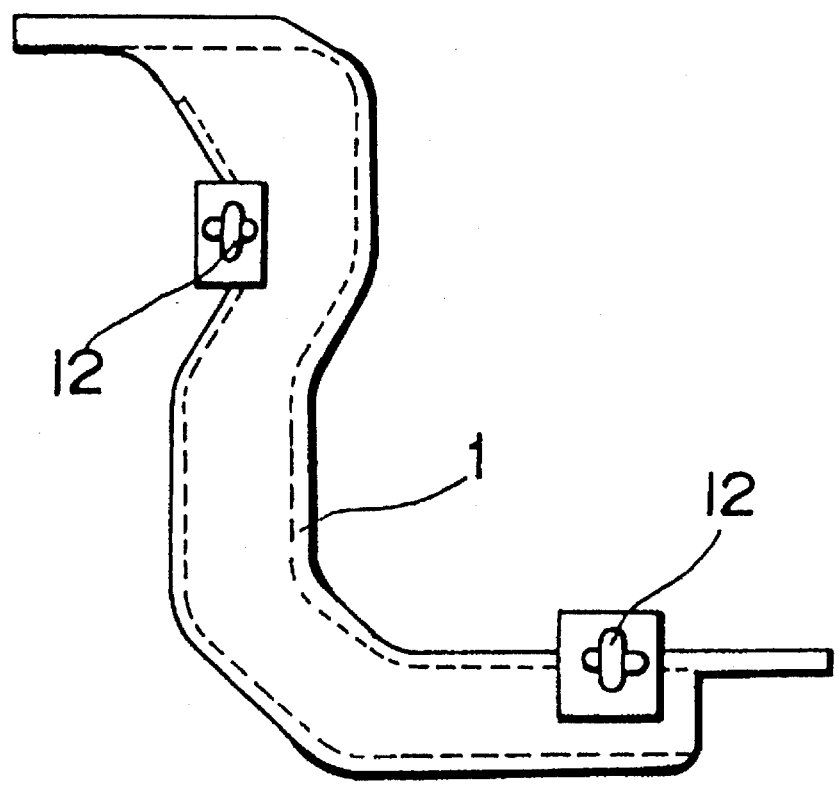
FIG. 9 is a front elevational view of the protector of FIG. 3 after attachment of the clip of FIG. 5A thereto.
Figure 10:
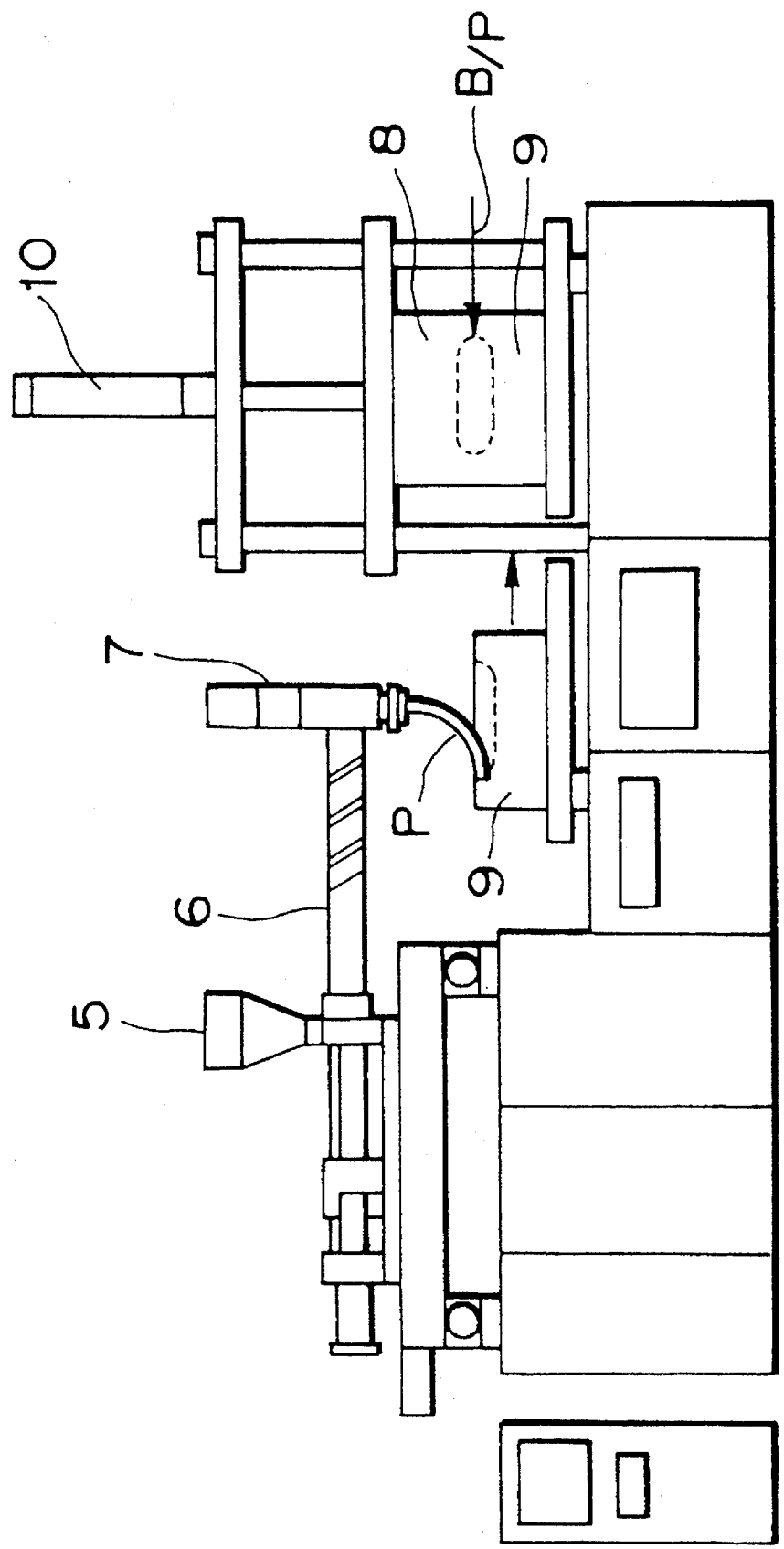
FIG. 10 is a front elevational view of a blow molding machine used for carrying out the method of FIG. 3.

One embodiment of the present invention is described with reference to the drawings. Basically, in a blow molding machine of FIG. 10 in which a method of attaching a clip to a blow molded article, according to one embodiment of the present invention is carried out, synthetic resin in a hopper 5 is heated into semi-molten 10 synthetic resin (parison) P by a heating cylinder 6 and the parison P is fed to a molding surface of a lower mold 9 from a crosshead 7. Subsequently, the lower mold 9 is displaced to a position below an upper mold 8 and the upper mold 8 is lowered by a clamp cylinder 10 such that the upper and lower molds 8 and 9 are closed. Thereafter, when blow pressure B/P is introduced into the upper and lower molds 8 and 9, the parison P is brought into close contact with molding surfaces of the upper and lower molds 8 and 9. As a result, a blow molded article, for example, a protector 1 for a wiring harness of a motor vehicle is obtained as shown in FIG. 9. After the protector 1 has been taken out of the upper and lower molds 8 and 9, the protector 1 is finished by cutting the protector 1 to an open cross-sectional shape with a laser cutter or a knife.

Figure 5A:
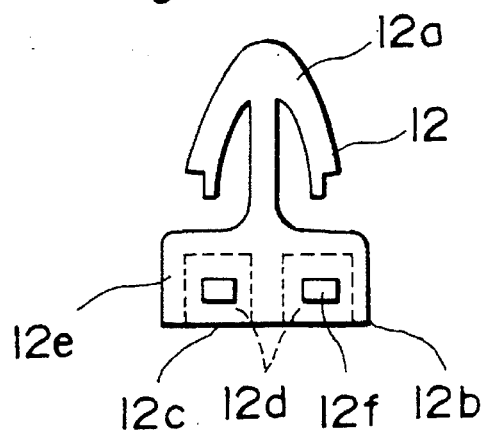
FIGS. 5A, 5B and 5C are a front elevational view, a side elevational view and a bottom plan view of the clip of FIG. 3, respectively.
Figure 5B:
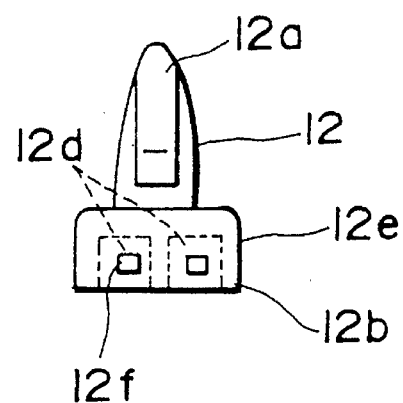
Figure 5C:
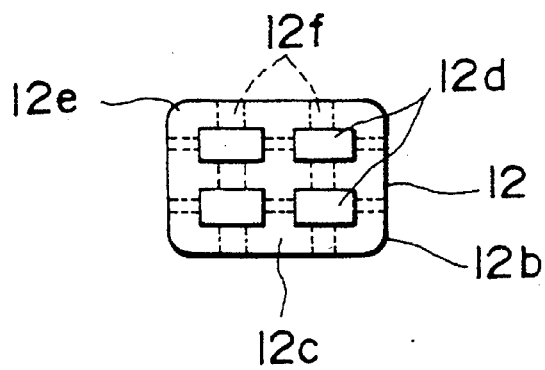

Meanwhile, as shown in FIGS. 5A to 5C, a clip 12 to be inserted into the protector 1 includes a clip body 12a having a shape of an arrowhead and a hollow clip base 12b formed integrally at a base portion of the clip body 12a. In view of bonding property of the clip 12, it is preferable that the clip 12 is made of material identical with that of the protector 1, e.g., polypropylene, nylon, PBT (polybutylene terephthalate), etc. Meanwhile, the clip 12 may also be made of material different from that of the protector 1, for example, metal.

The clip base 12b is formed into a rectangular shape and a lower face (molding surface) 12c of the clip base 12b has latticed hollows 12d. A number of through-holes 12f communicating with the hollows 12d longitudinally and sidewise are formed on a side wall 12e of the clip base 12b.

Figure 6:
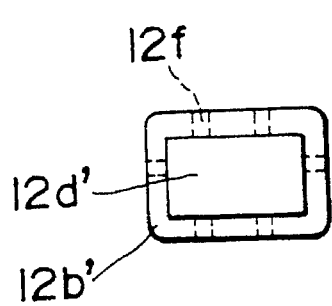
FIGS. 6, 7 and 8 are bottom plan views showing first to third modifications of a clip base of the clip of FIG. 5C, respectively.
Figure 7:
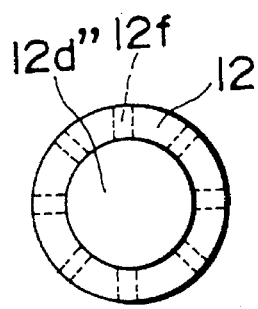
Figure 8:
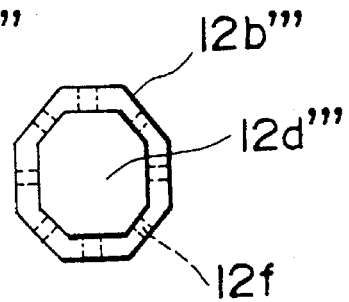

As shown in FIG. 6, the latticed hollows 12d may be replaced by a single rectangular hollow 12d' of a clip base 12b'. Meanwhile, as shown in FIGS. 7 and 8, the rectangular clip base 12b having the latticed hollows 12d may be, respectively, replaced by a circular clip base 12b'' having a single circular hollow 12d'' and a hexagonal clip base 12b''' having a single hexagonal hollow 12d'''.

Figure 1:
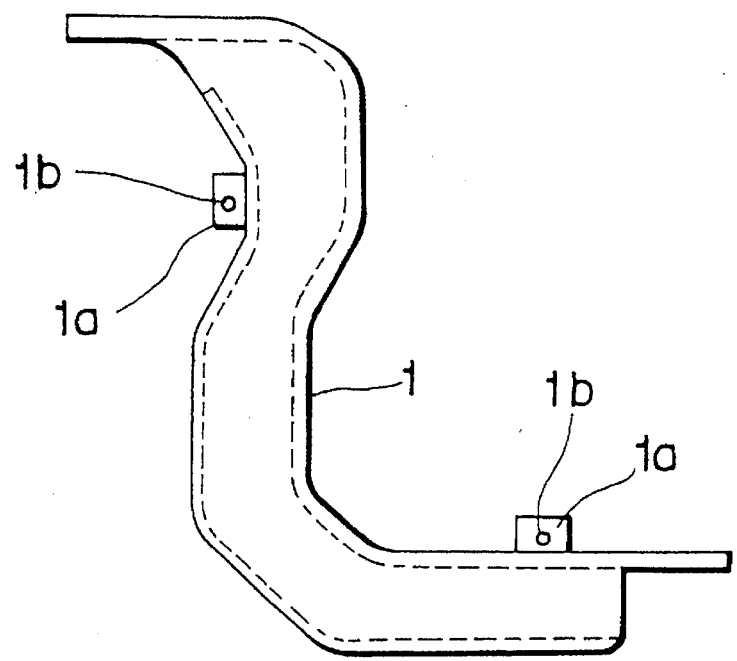
FIG. 1 is a front elevational view of a prior art protector (already referred to)
Figure 2:
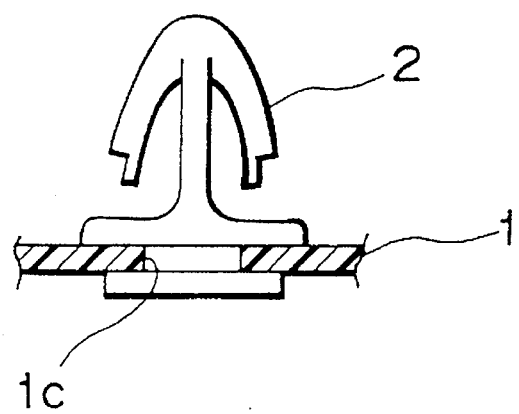
FIG. 2 is a fragmentary sectional view showing a clip attached to another prior art protector (already referred to)
Figure 3:
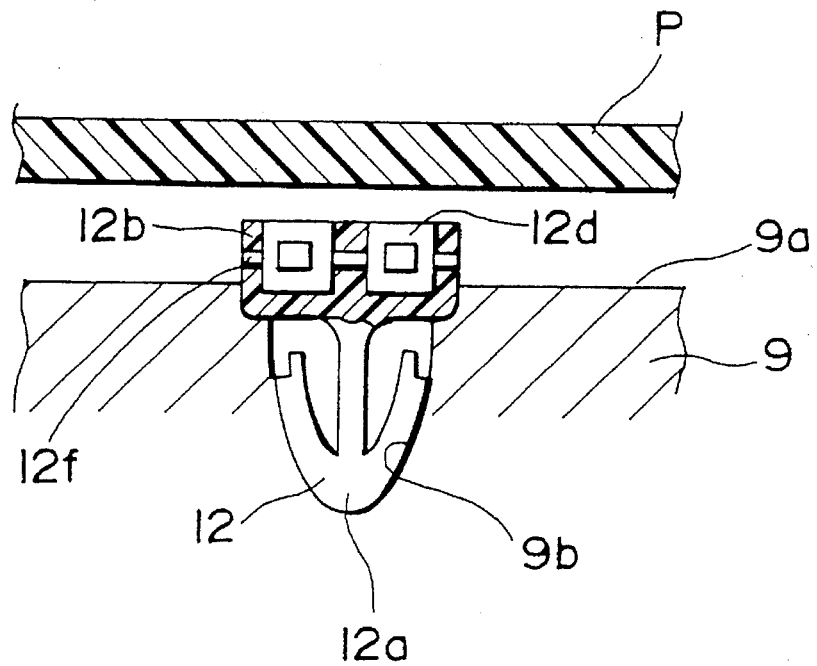
FIG. 3 is a fragmentary sectional view showing a mold prior to blow molding in a method of attaching a clip to a blow molded article, according to one embodiment of the present invention.
Figure 4:
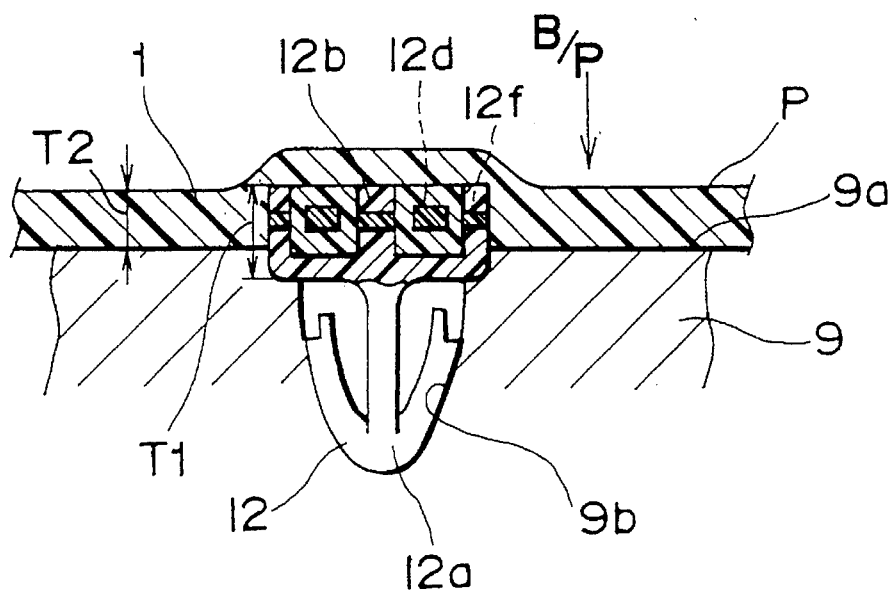
FIG. 4 is a fragmentary sectional view of the mold of FIG. 3 after blow molding.

In the upper and lower molds 8 and 9, a cavity 9b for receiving and positioning the clip body 12a of the clip 12 is formed at a proper location of, for example, a molding surface 9a of the lower mold 9 as shown in FIG. 3. By inserting the clip body 12a into the cavity 9b, the clip base 12b projects from the molding surface 9a. In order to insert the clip 12 into the protector 1 by using the upper and lower molds 8 and 9, the clip body 12a of the clip 12 is inserted into the cavity 9b of the lower mold 9 so as to be positioned as shown in FIG. 3. Then, the parison P is fed to the molding surface 9a of the lower mold 9 from the crosshead 7. Subsequently, the lower mold 9 is displaced to a location below the upper mold 8 and the upper mold 8 is lowered by the clamp cylinder 10 such that the upper and lower molds 8 and 9 are closed. Thereafter, when the blow pressure B/P is introduced into the upper and lower molds 8 and 9, the parison P is brought into close contact with the molding surface 9a of the lower mold 9 by the blow pressure B/P as shown in FIG. 4.

At the same time, the parison P is carried to the hollows 12d and the through-holes 12f of the clip base 12b so as to be filled into the hollows 12d and the through-holes 12f. As a result, simultaneously with blow molding, the clip 12 is inserted into the protector 1 subjected to blow molding by the upper and lower molds 8 and 9. The protector 1 having the clip 12 inserted thereinto is taken out of the upper and lower molds 8 and 9 and then, is finished by cutting the protector 1 as described above.

Since the parison P is readily delivered to the hollows 12d and the through-holes 12f, the parison P is closely filled into the hollows 12d and the through-holes 12f. Furthermore, since the parison P delivered to the hollows 12d and the through-holes 12f acts as a bridge for the clip base 12b, the clip 12 is rigidly fixed to the protector 1 by the parison P.

Therefore, in contrast with prior art, a clip hole is not required to be bored on the protector 1 after blow molding and thus, operation of fitting the clip into the clip hole also becomes unnecessary, thereby resulting in reduction of production cost of the protector 1.

Meanwhile, in order to minimize projection of the clip base 12b of the clip 12 towards interior of the protector 1, it is desirable that a height T1 of the clip base 12b of the clip 12 is so set as to be approximately equal to a wall thickness T2 of the protector 1 as shown in FIG. 4.

Blow molding referred to above has such advantages over conventional injection molding that degree of freedom in design is higher than injection molding and production cost of the molds can be made lower than that of injection molding because not only the molds can be made of zinc or aluminum alloy due to its low molding pressure, i.e., about one-hundredth of that of injection molding but only the female molds may be required to be prepared.

As is clear from the foregoing description of the method of the present invention, when the softened synthetic resin is brought into close contact with the molding surface of the mold at the blow pressure, the synthetic resin is filled into the hollows and the through-holes of the clip base of the clip so as to insert the clip into the blow molded article. Meanwhile, since the synthetic resin of the blow molded article is filled into the hollows and the through-holes of the clip base, the clip is rigidly fixed to the blow molded article.

Accordingly, in the present invention, since the clip hole is not required to be bored on the blow molded article after blow molding, operation of fitting the clip into the blow molded article also becomes unnecessary, thus resulting in reduction of production cost of the blow molded article.

What is claimed is:

1. A method of attaching a clip to a tubular blow molded article, comprising the steps of:

preparing a clip including a clip body and a clip base which is provided at a base portion of the clip body and has a side wall and a plurality of hollows, each hollow being separated from another hollow by at least one intermediate portion, and a plurality of through-holes extending through the side wall and the at least one intermediate portion for communicating with each hollow;

inserting the clip body of the clip into a cavity formed on a molding surface of a mold such that the clip base projects from the molding surface;

setting softened synthetic resin into the mold; and bringing the synthetic resin into close contact with the molding surface of the mold by blow molding at a blow pressure so as to deliver the synthetic resin to each hollow and the plurality of through-holes of the clip base such that the synthetic resin is filled into each hollow and the plurality of through-holes of the clip base, whereby the synthetic resin is molded to a blow molded article having the clip projecting from its outer peripheral surface.

2. A method as claimed in claim 1, wherein the blow molded article is an air duct in a motor vehicle.

3. A method as claimed in claim 1, wherein the blow molded article is a protector for a wiring harness in a motor vehicle.

* * * * *